(12) United States Patent
Kim et al.

(10) Patent No.: US 11,243,740 B2
(45) Date of Patent: Feb. 8, 2022

(54) ELECTRONIC DEVICE AND METHOD FOR CONTROLLING SAME

(71) Applicant: SAMSUNG ELECTRONICS CO., LTD., Suwon-si (KR)

(72) Inventors: Han-ki Kim, Suwon-si (KR); Hae-kwang Park, Suwon-si (KR); Young-suk Song, Suwon-si (KR); Jun-ho Sohn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/759,596

(22) PCT Filed: Oct. 4, 2018

(86) PCT No.: PCT/KR2018/011748
§ 371 (c)(1),
(2) Date: Apr. 27, 2020

(87) PCT Pub. No.: WO2019/088471
PCT Pub. Date: May 9, 2019

(65) Prior Publication Data
US 2020/0310745 A1 Oct. 1, 2020

(30) Foreign Application Priority Data
Oct. 31, 2017 (KR) ........................ 10-2017-0143221

(51) Int. Cl.
*G06F 3/16* (2006.01)
*G06F 3/0482* (2013.01)
(Continued)

(52) U.S. Cl.
CPC ............ *G06F 3/165* (2013.01); *G06F 3/0482* (2013.01); *G08C 17/02* (2013.01); *H04R 3/00* (2013.01);
(Continued)

(58) Field of Classification Search
None
See application file for complete search history.

(56) References Cited

U.S. PATENT DOCUMENTS 8,958,742 B2 2/2015 Lee et al.
9,191,721 B2 11/2015 Holladay et al.
(Continued)

FOREIGN PATENT DOCUMENTS

KR 10-2011-0046734 5/2011
KR 10-2013-0137924 12/2013
(Continued)

OTHER PUBLICATIONS

International Search Report for PCT/KR2018/011748 dated Jan. 14, 2019, 5 pages with English Translation.
(Continued)

*Primary Examiner* — Thomas S McCormack
(74) *Attorney, Agent, or Firm* — Nixon & Vanderhye, P.C.

(57) ABSTRACT

Disclosed is an electronic device. The electronic device comprises: a display; a storage unit for storing an application for integrally controlling a plurality of speakers operating on the basis of different wireless solutions; and a processor for driving the application according to a preset event. The application is capable of providing, through the display, a list containing identification information for the plurality of speakers, and providing, through the display, a UI screen including a function which is commonly provided to the different wireless solutions when one of the plurality of speakers is selected.

13 Claims, 10 Drawing Sheets

(51) Int. Cl.
*G08C 17/02* (2006.01)
*H04R 3/00* (2006.01)
*H04S 7/00* (2006.01)

(52) U.S. Cl.
CPC ...... *G08C 2201/30* (2013.01); *H04R 2420/01* (2013.01); *H04R 2420/07* (2013.01); *H04S 7/30* (2013.01); *H04S 2400/01* (2013.01)

(56) References Cited

U.S. PATENT DOCUMENTS

| | | |
|---|---|---|
| 10,009,687 B2 | 6/2018 | Lee et al. |
| 10,097,787 B2 | 10/2018 | Lim et al. |
| 2015/0256957 A1 | 9/2015 | Kim et al. |
| 2017/0034468 A1 | 2/2017 | Won et al. |
| 2017/0068507 A1 | 3/2017 | Kim et al. |
| 2017/0099325 A1* | 4/2017 | Steiner ................ H04L 65/1059 |
| 2017/0235461 A1 | 8/2017 | Oh et al. |
| 2017/0251314 A1 | 8/2017 | Pye, Jr. et al. |

FOREIGN PATENT DOCUMENTS

| | | |
|---|---|---|
| KR | 10-2015-0041974 | 4/2015 |
| KR | 10-2015-0104985 | 9/2015 |
| KR | 10-2015-0131896 | 11/2015 |
| KR | 10-2017-0015622 | 2/2017 |
| KR | 10-2017-0027999 | 3/2017 |
| KR | 10-2017-0046138 | 4/2017 |
| KR | 10-2017-0074445 | 6/2017 |
| KR | 10-2017-0095690 | 8/2017 |

OTHER PUBLICATIONS

Written Opinion of the ISA for PCT/KR2018/011748 dated Jan. 14, 2019, 9 pages with English Translation.
Notice of Preliminary Rejection dated Jul. 29, 2021 in counterpart Korean Patent Application No. 10-2017-0143221 and English-language translation.

* cited by examiner

ELECTRONIC DEVICE AND METHOD FOR CONTROLLING SAME

This application is the U.S. national phase of International Application No. PCT/KR2018/011748 filed Oct. 4, 2018 which designated the U.S. and claims priority to Korean Patent Application No. 10-2017-0143221 filed Oct. 31, 2017, the entire contents of each of which are hereby incorporated by reference.

TECHNICAL FIELD

The disclosure relates to an electronic device and a method for controlling the same, and more specifically to an electronic device providing a UI for controlling a plurality of speakers and a method for controlling the same.

BACKGROUND ART

Various wireless solutions for implementing wireless speakers are available, and speakers generally use wireless solutions different from one another based on the speaker manufacturer or use a different wireless solution by adopting technologies of different previously published wireless solution providers.

In order to control speakers using wireless solutions different from one another, different applications may be used.

Accordingly, a plurality of applications is required to control speakers using wireless solutions different from one another, and there is the inconvenience of not being able to maintain a continuity of user experience based on using applications different from one another.

SUMMARY

The disclosure is based on the above-described necessity, and an object of the disclosure is to provide an electronic device capable of collectively controlling a plurality of speakers operating based on different wireless solutions through an application stored with wireless solutions different from one another and a method for controlling the same.

According to an embodiment, an electronic device includes a display, a storage stored with an application for collectively controlling a plurality of speakers operating based on wireless solutions different from one another, and a processor configured to run the application according to a pre-set event, and the application is configured to provide a list including identification information on the plurality of speakers through the display, and provide a UI screen including a function commonly provided in the wireless solutions different from one another through the display based on one of the plurality of speakers being selected.

The application may store information on control data for each wireless solution different from one another corresponding to the function, and based on a user command for controlling a specific function of the selected speaker being input, convert the user command to control data of a wireless solution corresponding to the selected speaker based on the stored information.

The application may, based on receiving information indicating that an operation corresponding to the control data has been performed from the speaker, provide feedback indicating that the operation has been performed based on the received information through the display.

The application may provide the UI screen including a function commonly provided in a first wireless solution and a second wireless solution corresponding to the selected first speaker and the selected second speaker through the display based on the first speaker and the second speaker being selected, and based on a user command for controlling a specific function of the first speaker and the second speaker being input, convert the user command to a first control data and a second control data of the first wireless solution and the second wireless solution corresponding respectively to the first speaker and the second speaker to transmit to the first speaker and the second speaker respectively.

The application may provide a UI screen for receiving input of at least one of a name of a wireless solution corresponding to a speaker, a manufacturer name of the speaker, and a product name of the speaker, and based on at least one of a name of a wireless solution corresponding to the speaker, a manufacturer name of the speaker, and a product name of the speaker being input, search for speakers capable of connecting with the electronic device based on input information.

The application may identify an order of arrangement of the plurality of speakers on the list based on at least one from a selection history of a user including at least one of a time of selection and a frequency of selection and an order of arrangement at the time of searching for connectable speakers.

The UI screen may include a pre-set item, and the application may, based on the item being selected, additionally provide a menu corresponding to a unique function of the selected speaker.

The pre-set event may be an event with a plurality of speakers operating based on a user command or wireless solutions different from one another being identified as capable of connecting with the electronic device or identified as having connected with the electronic device.

According to an embodiment, a method of controlling an electronic device to store an application for collectively controlling a plurality of speakers operating based on wireless solutions different from one another includes running the application according to a pre-set event, and providing a list including identification information on the plurality of speakers by the application and providing a UI screen including a function commonly provided in the wireless solutions different from one another based on one of the plurality of speakers being selected.

The method may further include storing information on control data for wireless solutions different from one another corresponding to the function by the application, and based on a user command for controlling a specific function of the selected speaker being input, converting the user command to a control data of a wireless solution corresponding to the selected speaker by the application based on information stored in the application, and transmitting the control data to the selected speaker.

The method may further include, based on receiving information indicating that an operating corresponding to the control data has been performed from the speaker, providing feedback indicating that the operation has been performed by the application based on the received information.

The method may further include, providing the UI screen including a function commonly provided in a first wireless solution and a second wireless solution corresponding to a selected first speaker and a selected second speaker by the application based on the first speaker and the second speaker being selected from the plurality of speakers, and based on a user command for controlling a specific function of the first speaker and the second speaker being input, converting the user command to a first control data and a second control data of the first wireless solution and the second wireless solution corresponding respectively to the first speaker and the second speaker and transmitting the converted first control data and the converted second control data to the first speaker and the second speaker respectively by the application.

The method may further include, providing a UI screen for receiving input of at least one of a name of a wireless solution corresponding to a speaker, a manufacturer name of the speaker, and a product name of the speaker by the application, and based on at least one of a name of the wireless solution corresponding to the speaker, a manufacturer name of the speaker, and a product name of the speaker being input by the application, searching for a speaker capable of connecting with the electronic device based on an input information.

The method may further include, identifying an order of arrangement of the plurality of speakers on the list based on at least one of a user selection history including at least one of a time of selection and a frequency of section, and identification order at the time of searching for connectable speakers by the application.

The UI screen may include a pre-set item, and the method may further include additionally providing a menu corresponding to a unique function of the selected speaker based on the item being selected by the application.

The pre-set event may be an event with a plurality of speakers operating based on a user command or wireless solutions different from one another being identified as capable of connecting with the electronic device or identified as having connected with the electronic device.

According to an embodiment, a non-transitory computer readable medium stilling a computer instruction for an electronic device to perform an operation based on being executed by a processor of the electronic device may include and instruction for providing a list including identification information on a plurality of speakers operating based on wireless solutions different from one another, and an instruction for providing a UI screen including a function commonly provide in wireless solutions different from one another based on one from the plurality of speakers being selected.

According to various embodiments of the disclosure as described above, collectively controlling a plurality of speakers that operate based on wireless solutions different from one another with only one application may be achieved, and because continuity of user experience may be maintained by providing a UI screen including functions commonly provided to control the plurality of speakers, user convenience may be improved.

DETAILED DESCRIPTION OF EXAMPLE EMBODIMENTS

Figure 1:
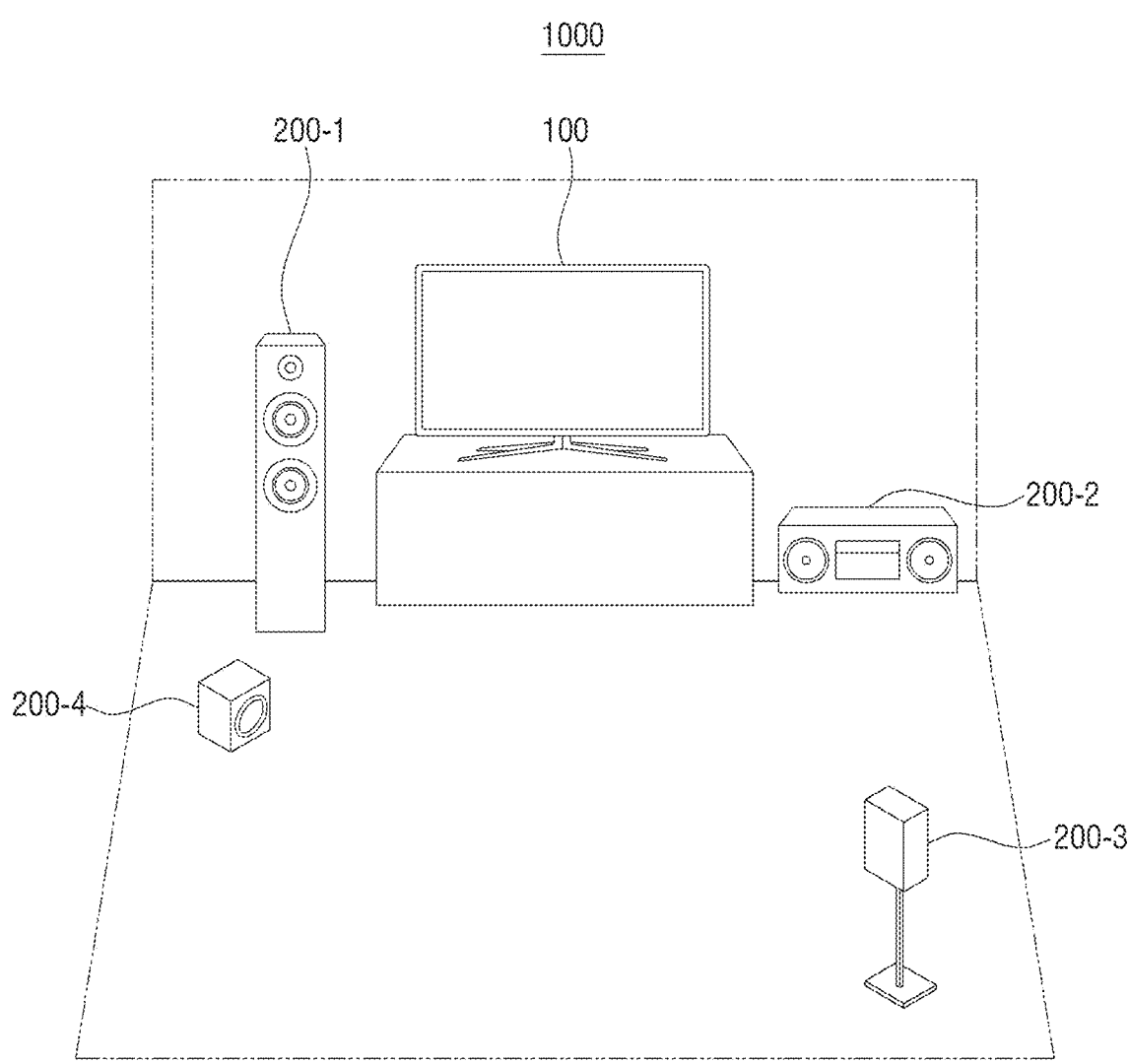
FIG. 1 is a schematic diagram for describing a system including an electronic device and a speaker according to an embodiment of the disclosure.

The disclosure will be described in greater detail below with reference to the attached drawings. In describing the embodiments, in case it is determined that the detailed description of related known functions or configurations may unnecessarily confuse the gist of the disclosure, the detailed description may be omitted. Further, the embodiments described below may be modified to various different forms, and the ideas and technical scope of the disclosure as set forth is not to limit the following embodiments. Rather, the embodiments are provided to describe the disclosure more fully and completely, and to fully transfer the technical idea of the disclosure to one of ordinary skill in the art.

In addition, 'comprising' a certain element may be understood as further comprising another element rather than excluding another element unless otherwise specified. Further, it should be noted that various elements and regions in the drawings may be schematically drawn. Accordingly, the technical idea of the disclosure may not be limited by the relative size or distance illustrated in the accompanying drawings.

In addition, the expression 'at least one of a, b and c' may be interpreted as 'a', 'b', 'c', 'a and b', 'a and c', 'b and c', or 'a, b and c'.

The disclosure will be described in greater detail below with reference to the accompanying drawings.

FIG. 1 is a schematic diagram for describing a system including an electronic device and a speaker according to an embodiment of the disclosure.

The electronic device 100 may include a function to control an external speaker 200. The electronic device 100 may be implemented as, for example, a television (TV). However, any device capable of connecting wirelessly with the external speaker 200 and controlling the external speaker 200 may be applicable, without being limited thereto. For example, the electronic device may be implemented as a smartphone, a tablet, a personal computer (PC), a Blu-ray player, and the like.

The external speaker 200 may be implemented to be controllable wirelessly by the electronic device 100. For example, the external speaker 200 may be implemented as a speaker device such as a wireless speaker, a sound bar, and a room speaker capable of outputting sound content. The speaker 200 may be explained below as referring to an external speaker located outside of the electronic device 100.

The speaker 200 may perform the function of outputting an audio signal. For example, the speaker 200 may include a plurality of speakers (or audio amplifier) capable of outputting multi-channels. The speaker 200 may, for example, include an L channel speaker and a R channel speaker playing back an L channel and R channel respectively. However, the speaker is not limited thereto, and the speaker 200 may be implemented in various forms. In another example, the speaker 200 may also be implemented in sound bar form playing back an L channel, a R channel, and a center channel.

Conventionally, there was the inconvenience of having to use applications different from one another to control a plurality of speakers 200-1, 200-2, 200-3, and 200-4 using wireless solutions (or wireless transmission technology) different from one another as in FIG. 1.

According to an embodiment, an application for collectively controlling a plurality of speakers operating based on wireless solutions different from one another may be stored in the electronic device 100, and if the application is a speaker capable of connecting to the electronic device 100 regardless of the type of wireless solution or type of speaker, a UI screen including a commonly provided function for controlling the corresponding speaker may be provided, and the speaker 200 may be controlled by transmitting a user command input through the UI screen to the selected speaker. The various embodiments of the disclosure will be described in greater detail below with reference to the drawings.

Figure 2:
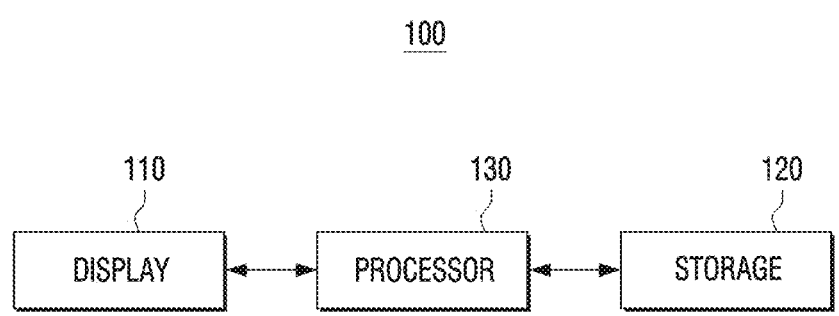
FIG. 2 is a block diagram for showing a configuration of an electronic device according to an embodiment of the disclosure.

FIG. 2 is a block diagram for showing a configuration of an electronic device according to an embodiment of the disclosure.

Referring to FIG. 2, the electronic device 100 may include a display 110, a storage 120, and a processor 130.

The display 110 may output content. The output content be a UI screen input with a user command to search or control the speaker 200 or a UI screen including a function that is commonly provided in wireless solutions (or wireless transmission technology) different from one another. In addition, the output content may be feedback information indicating that an operation according to input user command has been performed. The wireless solution, as a software including control data capable of controlling a corresponding speaker 200 wireless, may refer to wireless audio transmission technology. Accordingly, the wireless solution may be designated as a wireless transmission technology (or wireless audio transmission technology), but convenience of description, the term wireless solution may be used below.

The display 110 may be implemented in various forms such as, for example, a liquid crystal display (LCD), an organic light-emitting diode (OLED), a liquid crystal on silicon (LCoS), a digital light processing (DLP), a quantum dot (QD) display panel, and the like.

The storage 120 may store control programs for controlling the electronic device 100 and the processor 130, applications provided by the original manufacturer or downloaded externally, graphical user interface (GUI, hereinafter referred to as "GUI") related to the application, objects (e.g., image text, icon, button, etc.) for providing the GUI, user information, documents, databases, or related data.

The storage 120 may store applications for collectively controlling the plurality of speakers. For convenience of description, the application may be described below as referring to applications stored in the storage 120 for collectively controlling the plurality of speakers.

The storage 120 may be implemented as an internal memory such as a read-only memory (ROM), a random-access memory (RAM), or implemented as a memory separate from the processor 130. In this example, the storage 120 may be implemented in memory form embedded to the electronic device 100 or implemented in memory form detachable from the electronic device 100 according to data storage use. For example, in the case of data for driving of the electronic device 100, the data may be stored in the embedded memory in the electronic device 100, and in the case of data for extension function of the electronic device 100, the data may be stored in the memory detachable from the electronic device 100. In the case of the memory embedded in the electronic device 100, the memory may be implemented to forms such as a non-volatile memory, a volatile memory, a hard disk drive (HDD), or a solid state drive (SSD).

The processor 130 may control the overall operation of the electronic device 100.

According to an embodiment, the processor 130 may be implemented as a digital signal processor (DSP), a microprocessor, and a time controller (TCON) processing a digital signal. However, the embodiment is not limited thereto, and may include one or more of a central processing unit (CPU), a micro controller unit (MCU), a micro processing unit (MPU), a controller, an application processor (AP), a communication processor (CP), or an ARM processor, or may be defined by the corresponding term. In addition, the processor 130 may be implemented as a system on chip (SoC) embedded with a processing algorithm, a large scale integration (LSI), or may be implemented in the form of a field programmable gate array (FPGA).

The processor 130 may run an application for collectively controlling the plurality of speakers according to a pre-set event. The pre-set event may be a user command. For example, if a user selects an item indicating an application, the processor 130 may run the application.

Alternatively, the pre-set event may be an event with the plurality of speakers being identified as speakers capable of connecting with the electronic device 100, or identified as having connected with the electronic device 100. For example, when the electronic device 100 searches for a speaker capable of automatic connection or the searched speaker is set to automatically connect with the electronic device 100, the processor 130 may run the application if the plurality of speakers operating based on wireless solutions different from one another is identified as a speaker connectable with or connected with the electronic device 100.

The application according to an embodiment, as an application performing a function for controlling an external speaker, may be implemented to be able to control the plurality of speakers adopting wireless solutions different from one another with one application. The wireless solution may refer to a wireless platform capable of controlling the speaker 200 wirelessly. In general, speaker manufacturers may, either adopt previously published wireless solutions of external wireless audio transmission technology companies, or use their own wireless solution that has been developed by each manufacturer.

The application according to an embodiment may store information on control data for wireless solutions different from one another corresponding to a common function of the different wireless solutions in order to control the plurality of speakers adopting the different wireless solutions. The common function of the different wireless solutions may be a function commonly provided by each wireless solution from the speaker control function provided by the different wireless solutions.

The application according to an embodiment may provide a list including identification information on the plurality of speakers adopting wireless solutions different from one another through the display 110. The identification information may be at least one of a manufacture name of the speaker, a product name of the speaker, and a name of the wireless solution.

In addition, the application may, based on one of the plurality of speaker being selected, provide a UI screen including a function commonly provided in the wireless solutions different from one another through the display 110.

The function commonly provided to wireless solutions different from one another may be a basic speaker control function such as, for example, playback and pause, fast forward (or next song), rewind (or previous song), volume up and volume down, music playback management and equalization (EQ) function, and the like. However, the examples of common function are not limited thereto, and other functions may be added or some of the above-described function may be omitted.

The music playback management function may provide a progress bar to show a progress state of a music currently being played back, and provide a function identifying a playback order when a plurality of music is arranged in the playback list. For example, when a repeat function of a current song is selected, the current music may be repeatedly played back, and when a shuffle function is selected, the music arranged in the playback list may be played back in random order.

The EQ function may be a function that allows for selecting a type of timbre according to a content genre or a music genre. The type of timbre may be pre-set according to the content genre or the music genre or set so that a part a frequency component is greater or smaller according to user preference.

For example, control data of wireless solution A corresponding to a volume up function and control data of wireless solution B corresponding to the volume up function may be different. The control data for each wireless solution corresponding to not only the volume up function, but also different functions may be different.

The application may, when user command to control a specific function of the selected speaker is input, convert the user command to control data of the wireless solution corresponding to the selected speaker based on the stored information.

Because the control data for controlling the electronic device 100 and the selected speaker according to the user command may be different for each wireless solution, the application may convert the user command to control data of the wireless solution corresponding to the selected speaker.

For example, a volume up command being input to the electronic device 100 may be assumed.

If speaker A corresponding to wireless solution A is connected with the electronic device 100, the application may convert the volume up command to control data indicating the volume up instruction of wireless solution A. For example, the instruction may be converted to "Cmd: 3", which is the control data indicating the volume up instruction of wireless solution A.

In addition, if speaker B corresponding to wireless solution B is connected with the electronic device 100, the application may convert the volume up command as control data indicating the volume up instruction of wireless solution B. For example, the instruction may be converted to "Cmd: U", which is the control data indicating the volume up instruction of wireless solution B.

The application may transmit the converted control data to the selected speaker.

For example, "Cmd: 3", which is the control data indicating the volume up instruction of wireless solution A, may be transmitted to speaker A corresponding to wireless solution A. In addition, "Cmd: U", which is the control data indicating the volume up instruction of wireless solution B, may be transmitted to speaker B corresponding to wireless solution B.

The application may, based on receiving information indicating that an operation corresponding to the control data has been performed from the speaker, provide feedback indicating that the corresponding operation has been performed based on the received information through the display 110.

For example, is the specific speaker receives control data corresponding to the volume up and performs the volume up operation and information indicating that the volume up operation has been performed is received from the electronic device 100, the application may provide the feedback indicating that the volume up operation has been performed in the corresponding speaker.

The feedback may be feedback of providing an image or a text indicating that the corresponding operation has been performed through the display 110. For example, based on receiving information indicating that the volume up operation has been performed from the speaker, the application may provide feedback with at least one of a progress bar indicating the current volume size of the corresponding speaker which performed the volume up function and a number indicating a current volume size. However, the embodiment is not limited thereto, and the electronic device 100 may provide feedback outputting a specific sound or voice.

The application may provide a UI screen including a function that commonly provided in a first wireless solution and a second wireless solution corresponding to a first speaker and a second speaker selected when the first speaker and the second speaker are selected from the plurality of speakers through the display 110.

The first speaker may be a speaker using the wireless solution different from one another from the second speaker.

The function commonly provided in the first wireless solution and the second wireless solution may be a function for controlling the first speaker and the second speaker.

The application may, based on the user command for controlling a specific function of the first speaker and the second speaker being input, convert the user command to the first control data and the second control data of the first wireless solution and the second wireless solution corresponding to the first speaker and the second speaker respectively.

For example, a volume up command being input to the electronic device 100 may be assumed.

Based on speaker A corresponding to wireless solution A and speaker B corresponding to wireless solution B being connected with the electronic device 100, the application may convert the volume up command to a control data indicating the volume up instruction of wireless solution A and a control data indicating the volume up instruction of wireless solution B respectively. For example, the command may be converted to "Cmd: 3", which is the control data indicating the volume up instruction of wireless solution A and "Cmd: U", which is the control data indicating the volume up instruction of wireless solution B. The application may then transmit the converted control data "Cmd: 3" to speaker A corresponding to wireless solution A and transmit the converted control data "Cmd: U" to speaker B corresponding to wireless solution B.

Because the plurality of speakers using wireless solutions different from one another connected with the electronic device 100 may be conveniently controlled through the UI screen of one application, convenience may be provided to the user. The application may control the plurality of speakers using the same wireless solution.

The application may provide a UI screen for receiving input of at least one of a name of the wireless solution corresponding to the speaker, a manufacturer name of the speaker, and a product name of the speaker.

The application may search for speakers capable of connecting with the electronic device 100 based on input information when at least one of the name of the wireless solution corresponding to the speaker, the manufacturer name of the speaker, and the product name of the speaker is input. For example, when the electronic device 100 performs Bluetooth communication with the speaker, pairing, that is the process of discovering a speaker capable of wireless communication due to information therebetween being registered, may already have been performed, but the embodiment may not be limited thereto.

The application may, based on searching for the speaker 200 capable of connecting with the electronic device 100 without receiving input on information on the speaker 200 or the wireless solution, spend a relatively long time identifying whether the speaker corresponding to each wireless solution may be identified.

Based on at least one of the name of the wireless solution corresponding to the speaker, the manufacturer name of the speaker, and the product name of the speaker being input, the application may perform filtering so as to search for only speakers capable of connecting based on the input information. Accordingly, the time spent in identifying the speaker capable of connecting with the electronic device 100 may be reduced.

For example, when a specific wireless solution instruction is input, the application may identify whether the wireless solution corresponding to input information is stored in the application. When the wireless solution corresponding to the input information is stored in the application, the application may search for only the speaker corresponding to the relevant wireless solution and identify if the speaker is capable of connecting with the electronic device 100. If the wireless solution corresponding to the input information is not stored in the application, the application may provide feedback indicating that the speaker capable of connecting with the electronic device has not been identified. Alternatively, the application may provide an environment where the relevant wireless solution is downloadable through a wireless network.

The application may store information on a type of wireless solution corresponding to the manufacturer name of the speaker and the product name of the speaker. For example, when the manufacturer name of speaker A is input, the application may identify the type of wireless solution corresponding to the manufacturer of speaker A and identify whether the relevant solution may be the wireless solution stored in the application. In addition, when the product name of speaker A is input, the application may identify the type of wireless solution corresponding to the product of speaker A and identify whether the relevant wireless solution is the wireless solution stored in the application. Based on the wireless solution corresponding to the input information being stored in the application, only the speaker corresponding to the relevant wireless solution may be searched to identify whether the speaker is capable of connecting with the electronic device. Based on the wireless solution corresponding to the input information not being stored in the application, the application may provide feedback indicating that the speaker capable of connecting with the electronic device 100 was not identified.

The application may identify the arrangement order of the plurality of speakers on the list based on at least one of a selection history of the user including at least one of a time of selection and a frequency of selection, and the arrangement order when searching for connectable speakers.

The time of selection may refer to the time when the speaker for connecting with the electronic device 100 is selected. The relevant speaker may be preferentially arranged the more relatively recent the time of selection may be.

The frequency of selection may refer to the number of times the speaker for connecting with the electronic device 100 has been selected. The relevant speaker may be preferentially arranged the higher the frequency of selection may be.

The order of identification when searching for connectable speakers may refer to the order of the speaker relatively first identified when searching for speakers for connecting with the electronic device 100. The speaker with the relatively faster order of identification may be preferentially arranged. For example, when speaker A is first searched and speaker B is searched thereafter, speaker A may be arranged first than speaker B on the list.

The UI screen may include a pre-set item for providing a different function other than the above-described common function. For example, at least one of a search category, a setting category, a help category, and a menu category corresponding to the unique function of the selected speaker may be provided through the pre-set item. The menu category corresponding to the unique function of the speaker may be provided as a category in a form including the identification information (e.g., product name of speaker, icon of a form of speaker, etc.) of the relevant speaker, but is not limited thereto.

The search category may search content including music, and the setting category may include playback speed information, music information, and the like, and the help category may include information helpful in using the relevant application.

The unique function of the speaker may refer to a function provided only in the wireless solution adopted by the relevant speaker. If the menu category corresponding to the unique function of the speaker, for example, the selected speaker is speaker A, a "speaker A" category may be provided. If "speaker A" category is selected, a UI including the function that is provided only in the wireless solution corresponding to speaker A may be provided. For example, if speaker A includes the unique function of outputting rich bass sounds by specializing in bass sound output, the function of bass output may be selected.

Figure 3:
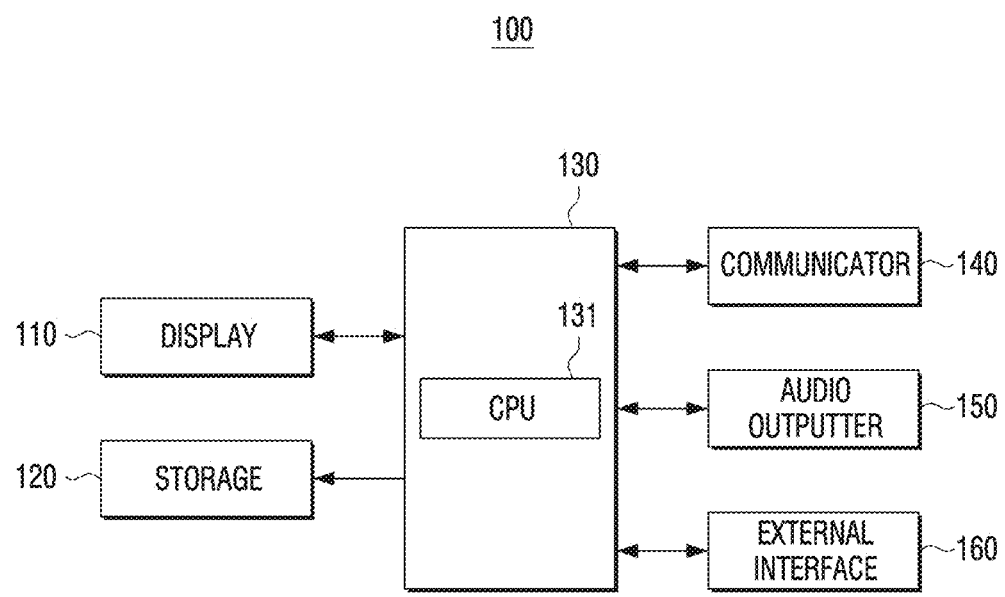
FIG. 3 is a block diagram for showing an example of a detailed configuration of an electronic device of FIG. 2.

FIG. 3 is a block diagram for showing an example of a detailed configuration of an electronic device of FIG. 2.

Referring to FIG. 3, the electronic device 100 may include a display 110, a storage 120, a processor 130, a communicator (e.g., communicator comprising circuitry) 140, an audio outputter 150, and an external interface 160. From the configurations illustrated in FIG. 3, detailed description of configurations overlapping with those disclosed in FIG. 2 be omitted.

The processor 130 may include a ROM (or a non-volatile memory) stored with a control program for controlling the CPU 131 and electronic device 100 and a RAM (or volatile memory) for storing data input externally or used as storage region corresponding to various operations performed in the electronic device 100.

The processor 130 may drive various applications including an application for collectively controlling the operating system (O/S) and programs stored in the storage 120 and the plurality of speakers based on a pre-set event being generated. The processor 130 may include a single core, a dual core, a triple core, a quad core, and multiple cores thereof.

The CPU 131 may access the storage 120 and perform booting using the O/S stored in the storage 120. The CPU may then use the various programs, content, data and the like stored in the storage 120 to perform various operations.

The communicator 140 may perform communication with the speaker 200. For example, information indicating that an operation corresponding to control data has been performed may be received from the speaker 200 through the communicator 140.

The communicator 140 may perform wireless communication with the speaker 200 through communication methods such as Bluetooth (BT), wireless fidelity (WI-FI), Zig-Bee, and infrared (IR), but may also perform communication with the speaker 200 through various communication methods such as serial interface, universal serial bus (USB), and near field communication (NFC).

For example, based on a pre-set event occurring, the communicator may be in a linked state by performing communication with the speaker 200 according to a pre-defined communication method. The linking may refer to all states in which communication becomes possible such as an operation of communication being initialized between the electronic device 100 and the speaker 200, an operation of forming a network, and an operation of device pairing being performed. For example, the device identification information of the speaker 200 may be provided to the electronic device 100, and a process of pairing between both devices may be performed accordingly. Based on a pre-set event occurring in the electronic device 100 or the speaker 200, surrounding devices may be searched and pairing with the searched device may be performed to be in a linked state through the digital living network alliance (DLNA) or other communication technology. Alternatively, a connecting method using Wi-Fi between the electronic device 100 and the speaker 200 may be used.

The audio outputter (i.e., audio outputter comprising circuitry) 150 may perform the function of outputting audio signals. For example, the audio outputter 150 may include a plurality of speaker units (or audio amplifier) capable of outputting multi-channels. For example, the audio outputter 150 may include a L channel speaker and a R channel speaker playing back an L channel and a R channel respectively. However, the embodiment is not limited thereto, and the audio outputter 150 may be implemented to various forms. In another example, the audio outputter 150 may also be implemented in a sound bar form playing back an L channel, a R channel, and a center channel.

The processor 130 may perform communication with the external interface 160. The external interface 160 may be a wired interface or a wireless interface. For example, the external interface may be a wired interface such as a USB or a wireless interface such as Bluetooth. The processor 130 may store the wireless solution received through the external interface 160 in the application.

Figure 4:
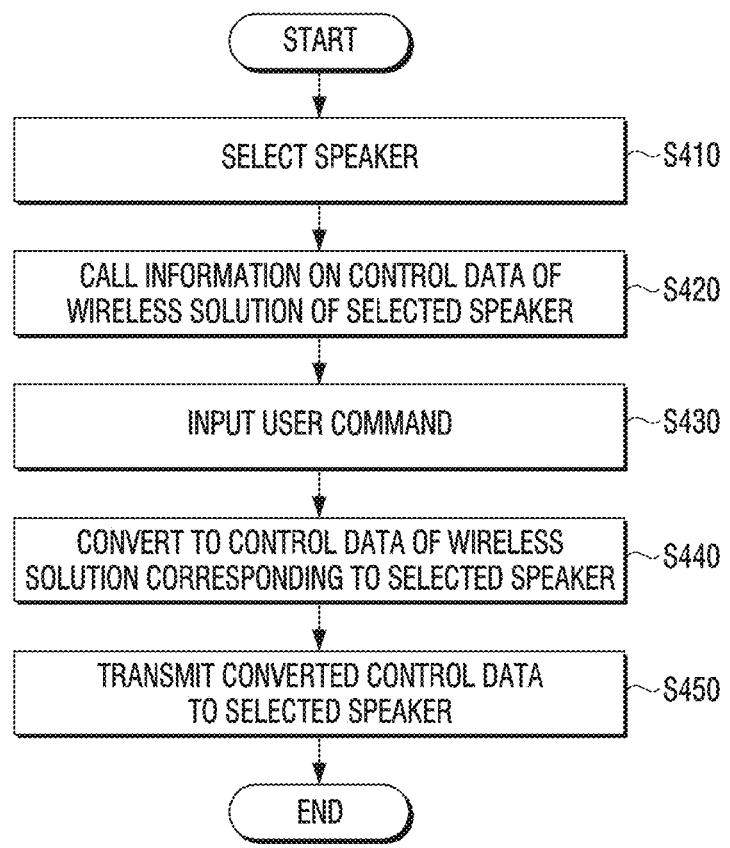
FIG. 4 is a flowchart for describing a method of transmitting a user command input to an electronic device to a speaker according to an embodiment of the disclosure.

FIG. 4 is a flowchart for describing a method of transmitting a user command input to an electronic device to a speaker according to an embodiment of the disclosure.

The application may provide a list including identification information on the plurality of speakers through the display 110, and one speaker may be selected from the plurality of speakers arranged on the list (S410).

The application may pre-store information on a control data of the wireless solution corresponding to each function of the selected speaker. The application may call information on the control data of the wireless solution corresponding to the selected speaker (S420).

Based on the user command for controlling the selected speaker being input (S430), the application may convert the user command to control data of the wireless solution corresponding to the selected speaker (S440). The control data for controlling each speaker according to the user command may be different by each wireless solution and the application may convert the user command to control data of the wireless solution corresponding to each speaker.

For example, a volume up command being input to the electronic device 100 may be assumed.

If speaker A corresponding to wireless solution A is connected with the electronic device 100, the application may convert the volume up command to control data indicating the volume up instruction of wireless solution A. For example, the command may be converted to "Cmd: 3", which is the control data indicating the volume up instruction of wireless solution A.

In addition, if speaker B corresponding to wireless solution B is connected with the electronic device 100, the application may convert the volume up command to control data indicating the volume up instruction of wireless solution B. For example, the command may be converted to "Cmd: U", which is the control data indicating the volume up instruction of wireless solution B.

The application may transmit the converted control data to the selected speaker (S450).

For example, "Cmd: 3", which is the control data indicating the volume up instruction of wireless solution A, may be transmitted to speaker A corresponding to wireless solution A. In addition, "Cmd: U", which is the control data indicating the volume up instruction of wireless solution B, may be transmitted to speaker B corresponding to wireless solution B.

The having selected a plurality of speakers in the select speaker stage (S410) may be assumed.

Based on the first speaker and the second speaker being selected, the application may call information on control data of the wireless solution of the selected first speaker and the selected second speaker.

Based on user command being input, the application may then respectively convert the input user command to control data for each wireless solutions corresponding to the selected first speaker and the selected second speaker and transmit the converted control data to the first speaker and the second speaker respectively.

For example, based on the input user command being a volume up command, if speaker A corresponding to wireless solution A and speaker B corresponding to wireless solution B is connected with the electronic device 100, the application may convert the volume up command to the control data indicating the volume up instruction of wireless solution A and the control data indicating the volume up instruction of wireless solution B respectively. The command may be converted to "Cmd: 3", which is the control data indicating the volume up instruction of wireless solution A, and "Cmd: U", which is the control data indicating the volume up instruction of wireless solution B. The application may then transmit the converted control data "Cmd: 3" to speaker A corresponding to wireless solution A and transmit the converted control data "Cmd: U" to speaker B corresponding to wireless solution B.

Figure 5:
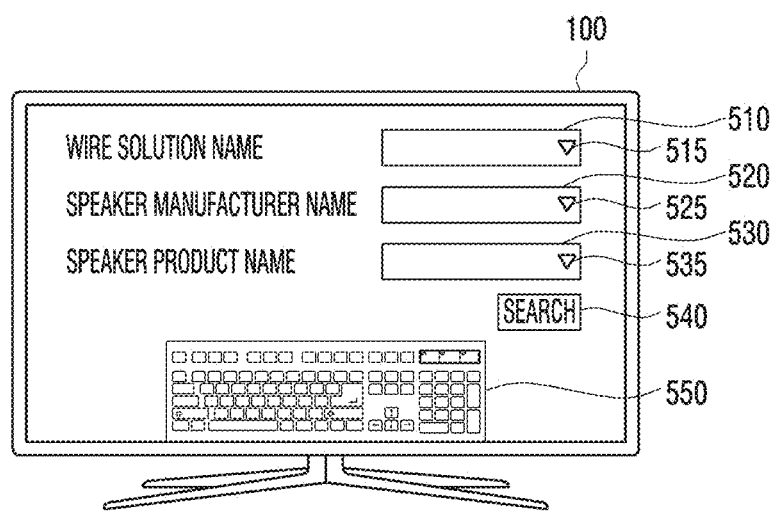
FIG. 5 is a diagram for describing an operation of searching for a speaker by filtering when searching for speakers according to an embodiment of the disclosure.

FIG. 5 is a diagram for describing an operation of searching for a speaker by filtering when searching for speakers according to an embodiment of the disclosure.

The application may, based on searching for speakers capable of connecting with the electronic device 100 when information on the speaker has not been received, require a relatively long time in identifying whether the speaker corresponding to each wireless solution has been identified.

Based on at least one of the name of the wireless solution corresponding to the speaker, the manufacturer name of the speaker, and the product name of the speaker being input, the application may perform filtering to search only for connectable speakers based on the input information. Accordingly, the application may reduce the time required in identifying the speaker capable of connecting with the electronic device 100.

Referring to FIG. 5, the application may provide a UI screen 510, 520 or 530 for receiving input of at least one of the name of the wireless solution corresponding to the speaker, the manufacturer name of the speaker, and the product name of the speaker and perform filtering to search only for speakers capable of connecting with the electronic device 100 based on the input information.

Based on the UI screen 510, 520 or 530 for receiving input on at least one information of the name of the wireless solution corresponding to the speaker, the manufacturer name of the speaker, and the product name of the speaker being displayed, the application may receive input on the above-described information from the user by providing a virtual keyboard 550. The text input through the virtual keyboard 550 may be displayed on the UI screen 510, 520 or 530.

However, the embodiment is not limited thereto, and the electronic device 100 may recognize user utterance through a voice recognition function and display the recognized text to the UI screen 510, 520 or 530.

The application may receive input on the text directly through the virtual keyboard 550, but may receive input on information by providing the list related to the name of the wireless solution, the manufacturer name of the speaker and the product name of the speaker respectively.

The application may provide the stored name of the wireless solution as a list. For example, the application may provide an icon 515 of a specific form to a pre-set area of the UI screen 510 to receive input on the name of the wireless solution. If the relevant icon 515 is selected, the application may display the list related to the stored name of the wireless solution. When at least one wireless solution is selected from the arranged list and a search button 540 is selected, the application may perform filtering to search only for speakers corresponding to the selected wireless solution.

Because the application does not perform a search on speakers corresponding to wireless solutions that have not been selected, the time required in the search may be reduced.

In addition, the application may provide the manufacturer name of the speaker corresponding to the stored wireless solution as a list. For example, the application may provide an icon 525 of a specific form to a pre-set area of the UI screen 520 for receiving input of the manufacturer name of the speaker. Based on the relevant icon 525 being selected, the application may display the list related to the manufacturer name of the speaker corresponding to the stored wireless solution.

In addition, the application may provide the product name of the speaker corresponding to the stored wireless solution as a list. For example, the application may provide an icon 535 of a specific form to a pre-set area of the UI screen 530 for receiving input on product name of the speaker. Based on the relevant icon 535 being selected, the application may display the list related to the product name of the speaker corresponding to the stored wireless solution.

Based on at least one of the name of the wireless solution corresponding to the speaker, the manufacturer name of the speaker, and the product name of the speaker being input and the search button 540 being selected, the application may perform filtering to search only for speakers capable of connecting with the electronic device 100 based on the input information.

Figure 6:
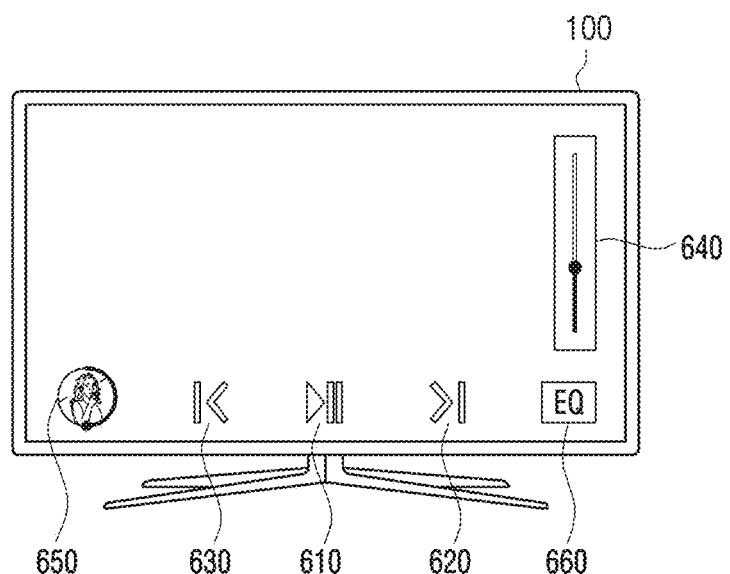
FIG. 6 is a diagram for describing a UI screen including functions commonly provided in wireless solutions different from one another according to an embodiment of the disclosure.

FIG. 6 is a diagram for describing a UI screen including functions commonly provided in wireless solutions different from one another according to an embodiment of the disclosure.

Referring to FIG. 6, the function commonly provided in wireless solutions different from one another may be basic functions such as, for example, playback and pause 610, fast forward (or next song) 620, rewind (or previous song) 630, volume up and volume down 640, music playback management 650 and EQ function 660, and the like.

The music playback management function may provide a progress bar for indicating the progress state of the music currently being played back, provide lyrics of the music currently being played back when the icon 650 indicating the music playback management function is selected, and provide the function of identifying the playback order if a plurality of music is arranged on the playback list. For example, based on the repeat current song function being selected, the current music may be repeated and played back, and the music arranged in the playback list nay be played hack in random order if a shuffle function is selected.

The EQ function may refer to the function of selecting the type of timbre according to the content genre or the music genre. The type of timbre may be pre-set according to the content genre or the music genre or set so that a part a frequency component is greater or smaller according to user preference.

Figure 7:
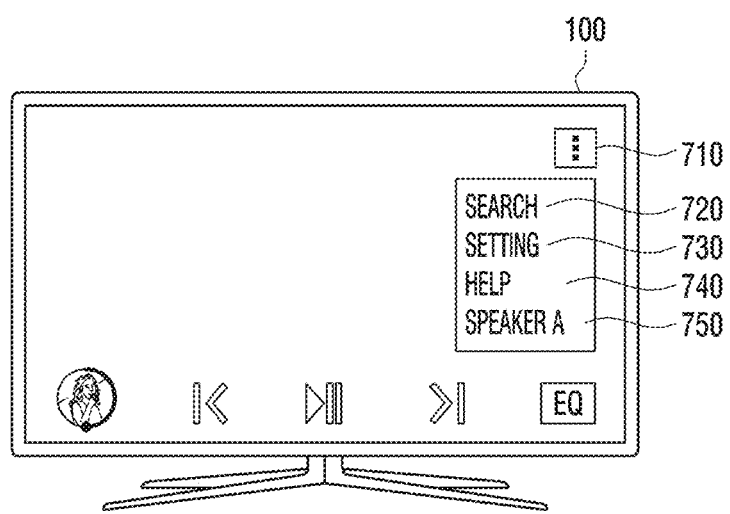
FIG. 7 is a diagram for describing a method for selecting a unique function of a selected speaker according to an embodiment of the disclosure.

FIG. 7 is a diagram for describing a method for selecting a unique function of a selected speaker according to an embodiment of the disclosure.

Referring to FIG. 7, the UI screen including the function commonly provided in wireless solutions different from one another for controlling the speaker may include a pre-set item. The pre-set item may be provided in the form of an icon 710 including a menu category for controlling the speaker 200.

For example, if the icon 710 indicating the pre-set item is selected, the application may provide at least one of a menu category 750 corresponding to the a search category 720, a setting category 730, a help category 740 and a menu category 750 corresponding to the unique function of the selected speaker. The menu category 750 corresponding to the unique function of the speaker may be provided as a category in a form including the identification information (e.g., product name of speaker, icon of a form of speaker, etc.) of the relevant speaker, but is not limited thereto.

The search category 720 may search for content including music, and the setting category 730 may include information on playback speed, music information and the like, and the help category 740 may include information helpful is using the relevant application.

The unique function of the speaker may refer to a function provided only in the wireless solution adopted by the relevant speaker. If the menu category corresponding to the unique function of the speaker, for example, the selected speaker is speaker A, a "speaker A" category may be provided. If "speaker A" category is selected, a UI including the function that is provided only in the wireless solution corresponding to speaker A may be provided.

Figure 8:
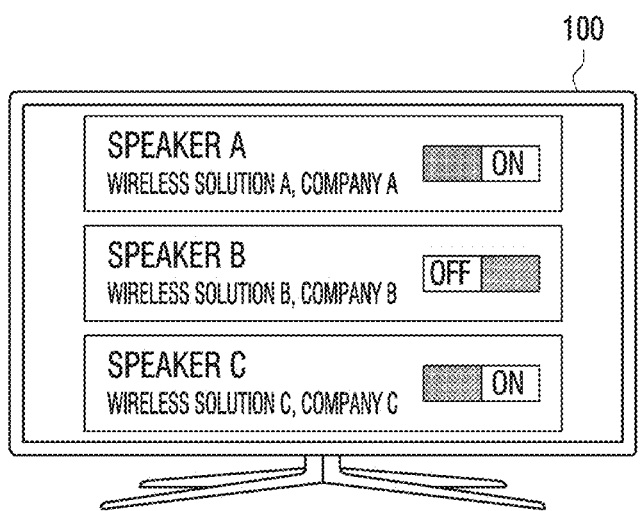
FIG. 8 is a diagram for describing a list including identification information on a plurality of speakers according to an embodiment of the disclosure.

FIG. 8 is a diagram for describing a list including identification information on a plurality of speakers according to an embodiment of the disclosure.

Referring to FIG. 8, the application stored in the storage 120 may provide a list including the identification information on at least one identified speaker if the speaker corresponding to the wireless solution stored in the application is identified.

The identified information may be one of the name of the wireless solution corresponding to the identified speaker, the manufacturer name of the identified speaker, and the product name of the identified speaker.

The application may receive user command input through an ON OFF button. For example, if speaker A is selected and is turned ON, the application may generate control data corresponding to the wireless solution of speaker A and transmit the generated control data to speaker A. Based on receiving information indicating that connection with the electronic device 100 has been performed, the application may provide feedback indicating that the electronic device 100 and speaker A has been connected through the display 110 based on the received information.

If a plurality of speakers corresponding to wireless solutions different from one another is identified and a list including the identification information of the plurality of speakers is provided, for example, a list including the identification information on speaker A, speaker B and speaker C is provided, speaker A and speaker C may be selected.

The user may select speaker A corresponding to wireless solution A and change to a ON state, and select speaker C corresponding to wireless solution C and change to a ON state. In one example, based on the user command for music playback being input, the application may then convert the music playback command to control data corresponding to wireless solution A and wireless solution B respectively, and transmit the converted control data different from one another to speaker A and speaker B respectively. Speaker A and speaker B based on wireless solutions different from one another may playback the same music according to the music playback command of the user.

Figure 9:
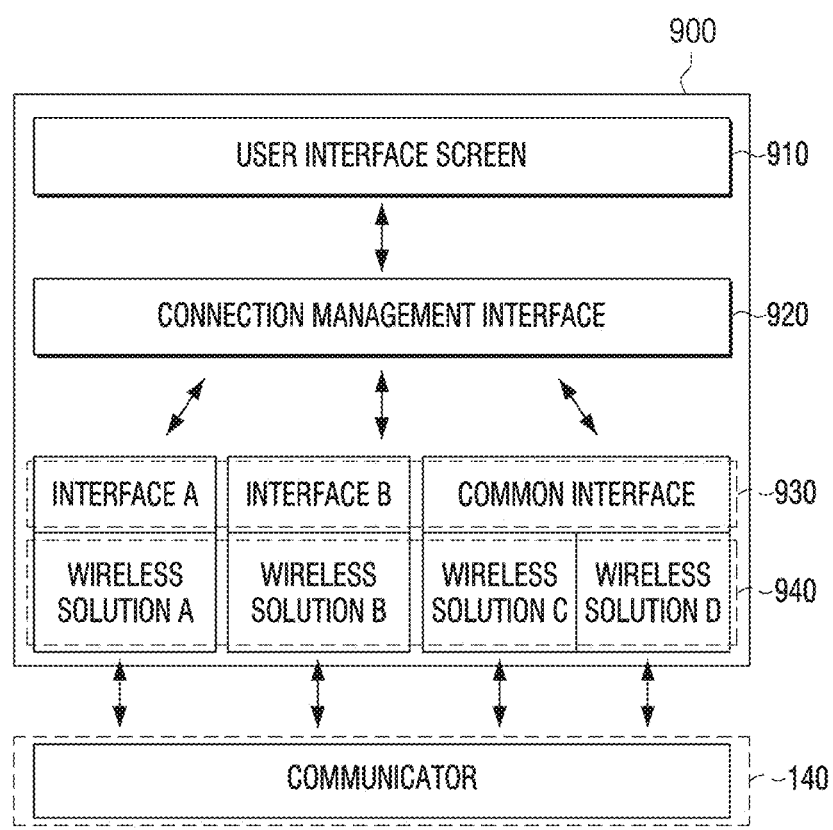
FIG. 9 is a block diagram of an application for collectively controlling a plurality of speakers according to an embodiment of the disclosure.

FIG. 9 is a block diagram of an application for collectively controlling a plurality of speakers according to an embodiment of the disclosure.

The application 900 for collectively controlling the plurality of speakers according to an embodiment may be a software, the each components of the application 900 may be respective modules of software.

As illustrated in FIG. 9, the application may include a user interface screen 910, a connection management interface 920, an interface 930 corresponding to the wireless solution, and a wireless solution 940.

The user interface screen 910 may provide a UI screen including the function commonly provided to control the plurality of speakers, a UI screen for receiving input on the name of the wireless solution corresponding to the speaker, the manufacturer name of the speaker, and the product name of the speaker, and the like. In addition, the user interface screen 910 may provide feedback indicating that a specific operation has been performed in the speaker 950.

The connection management interface 920 may refer to a platform connecting the user interface screen 910 and the wireless solution 940. The connection management interface 920 may receive information on the relevant wireless solution from the interface 930 of the wireless solution corresponding to the selected speaker.

The connection management interface 920 may, based on a user command for controlling a specific function of the speaker being input, convert the user command to control data of the wireless solution corresponding to the selected speaker based on information received from the wireless solution.

For example, a volume up command being input may be assumed.

If the selected speaker is speaker A, the connection management interface 920 may convert the volume up command to "Cmd: 3", which is the control data indicating the volume: up instruction of wireless solution A.

Alternatively, if the selected speaker is speaker B, the connection management interface 920 may convert the volume up command to "Cmd: U", which is the control data indicating the volume up instruction of wireless solution B.

The connection management interface 920 may transmit information corresponding to the relevant feedback operation by analyzing feedback information received from the specific interface to the user interface screen 910.

The interface 930 may refer to a platform exchanging information with the connection management interface 920 and the communicator 140. The interface 930 may be different for each wireless solution, but is not limited thereto, and a common interface that is common in wireless solutions different from one another may be used. For example, although companies of different wireless solutions may not only produce wireless solutions but also interfaces different from one another, only the wireless solution may be separately produced and the same interface 930 may be used.

Specifically, each interface may transmit information on the wireless solution corresponding to the relevant interface to the connection management interface 920. In addition, the interface 930 may receive control data converted based on the user command from the connection management interface 920. The interface 930 may transmit the converted control data to the communicator 140.

For example, when speaker A is selected, interface A may transmit control data received from the connection management interface 920 to the communicator 140, and the transmitted control data may be transmitted to speaker A through the communicator 140.

Figure 10:
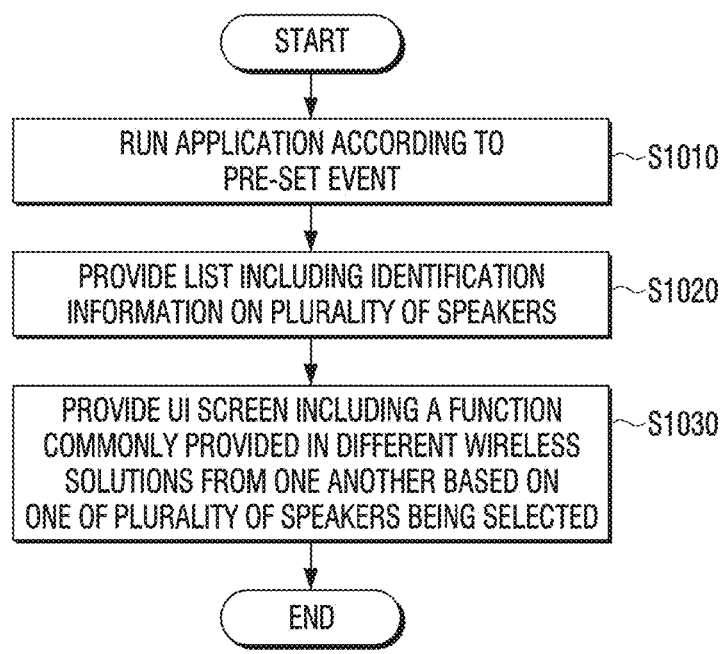
FIG. 10 is a flowchart for describing a method for controlling an electronic device according to an embodiment of the disclosure.

FIG. 10 is a flowchart for describing a method for controlling an electronic device according to an embodiment of the disclosure.

Referring to FIG. 10, the electronic device 100 may run an application for collectively controlling the plurality of speakers according to the pre-set event (S1010).

The pre-set event may be the user command. For example, when the user selects an item indicating the application, the processor 130 may run the application.

Alternatively, the pre-set event may be an event with the plurality of speakers operating based on wireless solutions different from one another being identified as a speaker capable of connecting with or having connected with the electronic device 100. For example, if the electronic device 100 is set to automatically search for connectable speakers 200 or the searched speaker 200 is set to automatically connect with the electronic device 100, the processor 130 may run the application when the plurality of speakers operating based on wireless solutions different from one another is identified as speakers capable of connecting with or having connected with the electronic device 100.

The application may search for the speaker corresponding to the stored wireless solution, and provide the list including the identification information on the searched plurality of speakers (S1020).

The identification information may be one of the name of the wireless solution corresponding to the identified speaker, the manufacturer name of the identified speaker, and the product name of the identified speaker.

Based on one from the plurality of speakers being selected, the application may provide the UI screen including the function that is commonly provided in the wireless solutions different from one another (S1030).

The function commonly provided in wireless solutions different from one another may be basic functions such as, for example, playback, pause, fast forward (or next song), rewind (or previous song), volume up and volume down, music playback management and EQ function, and the like.

Even if the first speaker and the second speaker from the plurality of speakers is selected, the application may provide a UI screen including the function provided commonly in wireless solutions different from one another.

Because detailed operations of each stage has been described above, and the detailed description thereof may be omitted.

The various embodiments described above may be implemented in a recordable medium which is readable by computer or a device similar to computer using software, hardware, or the combination of software and hardware. In some cases, the embodiments described herein may be implemented by the processor itself. According to a software implementation, embodiments such as the procedures and functions described herein may be implemented with separate software modules. Each of the above-described software modules may perform one or more of the functions and operations described herein.

The computer instructions for performing the processing operations according to the various embodiments described above may be stored in a non-transitory computer-readable medium. The computer instructions stored in this non-transitory computer-readable medium may cause specific devices to perform the processing operations according to the above-described various embodiments when executed by the processor of the specific device. In addition, the applications stored in the storage 120 for collectively controlling the plurality of speakers may be driven in a non-transitory computer readable medium.

The non-transitory computer readable medium refers to a medium that stores data semi-permanently rather than storing data for a very short tune, such as a register, a cache, a memory or etc., and is readable by a device. Specific examples of the non-transitory computer readable medium may include, for example, a compact disc (CD), a digital versatile disc (DVD), a hard disc, a Blu-ray disc, a USB, a memory card, a ROM, and the like.

The description above illustrates and describes exemplary embodiments of the disclosure and are not to be construed as limiting the disclosure. It will be understood by those of ordinary skill in the art that various changes in form and details may be made therein without departing from the spirit and scope of the disclosure, and the various changes in form and details are not to be understood as individual from the technical idea or scope of the disclosure.

What is claimed is:

1. An electronic device comprising:
a display;
a storage storing an application for collectively controlling a plurality of speakers operating based on wireless solutions different from one another; and
a processor configured to run the application according to a pre-set event,
wherein the application is configured to:
provide a UI screen for receiving input of at least one of a name of a wireless solution corresponding to a speaker, a manufacturer name of the speaker, or a product name of the speaker,
based on at least one of a name of a wireless solution corresponding to the speaker, a manufacturer name of the speaker, or a product name of the speaker being input, search for speakers capable of connecting with the electronic device based on input information,
provide a list comprising identification information on the searched plurality of speakers through the display,
provide a UI screen comprising a function commonly provided in the wireless solutions different from one another through the display based on one of the plurality of speakers being selected,
based on a user command for controlling a specific function of the selected speaker being input, convert the user command to control data of a wireless solution corresponding to the selected speaker, and transmit the control data to the selected speaker.

2. The electronic device of claim 1, wherein the application is configured to:
store information on control data for each wireless solution different from one another corresponding to the function; and
based on the user command being input, convert the user command to the control data of the wireless solution corresponding to the selected speaker based on the stored information.

3. The electronic device of claim 2, wherein the application is configured to, based on receiving information indicating that an operation corresponding to the control data has been performed from the speaker, provide feedback indicating the operation has been performed based on the received information through the display.

4. The electronic device of claim 1, wherein the application is configured to:
provide the UI screen comprising a function commonly provided in a first wireless solution and a second wireless solution corresponding to a selected first speaker and a selected second speaker through the display based on the first speaker and the second speaker being selected among the plurality of speakers; and
based on the user command for controlling a specific function of the first speaker and the second speaker being input, convert the user command to first control data and second control data of the first wireless solution and the second wireless solution corresponding respectively to the first speaker and the second speaker to transmit to the first speaker and the second speaker respectively.

5. The electronic device of claim 1, wherein the application is configured to identify an order of arrangement of the plurality of speakers on the list based on at least one from a selection history of a user comprising at least one of a time of selection or a frequency of selection, or an order of arrangement at the time of searching for connectable speakers.

6. The electronic device of claim 1, wherein the UI screen includes a pre-set item, and the application is configured to, based on the item being selected, additionally provide a menu corresponding to a unique function of the selected speaker.

7. The electronic device of claim 1, wherein the pre-set event is an event with a plurality of speakers operating based on a user command or wireless solutions different from one another being identified as capable of connecting with the electronic device or identified as having connected with the electronic device.

8. A method of controlling an electronic device to store an application for collectively controlling a plurality of speakers operating based on wireless solutions different from one another, the method comprising:

running the application according to a pre-set event;

providing a UI screen for receiving input of at least one of a name of a wireless solution corresponding to a speaker, a manufacturer name of the speaker, or a product name of the speaker by the application;

based on at least one of a name of the wireless solution corresponding to the speaker, a manufacturer name of the speaker, or a product name of the speaker being input by the application, searching for a speaker capable of connecting with the electronic device based on an input information;

providing a list comprising identification information on the searched plurality of speakers by the application and providing a UI screen comprising a function commonly provided in the wireless solutions different from one another based on one of the plurality of speakers being selected;

based on a user command for controlling a specific function of the selected speaker being input, converting the user command to a control data of a wireless solution corresponding to the selected speaker by the application; and transmitting the control data to the selected speaker.

9. The method of claim 8, the method further comprising:

storing information on control data for wireless solutions different from one another corresponding to the function by the application, and based on the user command being input, converting the user command to the control data of the wireless solution corresponding to the selected speaker by the application based on information stored in the application.

10. The method of claim 9, the method further comprising:

based on receiving information indicating that an operation corresponding to the control data has been performed from the speaker, providing feedback indicating that the operation has been performed by the application based on the received information.

11. The method of claim 8, the method further comprising:

providing the UI screen comprising a function commonly provided in a first wireless solution and a second wireless solution corresponding to a selected first speaker and a selected second speaker by the application based on the first speaker and the second speaker being selected from the plurality of speakers; and based on a user command for controlling a specific function of the first speaker and the second speaker being input, converting the user command to first control data and second control data of the first wireless solution and the second wireless solution corresponding respectively to the first speaker and the second speaker and transmitting the converted first control data and the converted second control data to the first speaker and the second speaker respectively by the application.

12. The method of claim 8, the method further comprising:

identifying an order of arrangement of the plurality of speakers on the list based on at least one of a user selection history comprising at least one of a time of selection or a frequency of section, or identification order at the time of searching for connectable speakers by the application.

13. The method of claim 8, wherein the UI screen comprises a pre-set item, and wherein the method further comprises additionally providing a menu corresponding to a unique function of the selected speaker based on the item being selected by the application.

* * * * *